UNITED STATES PATENT OFFICE.

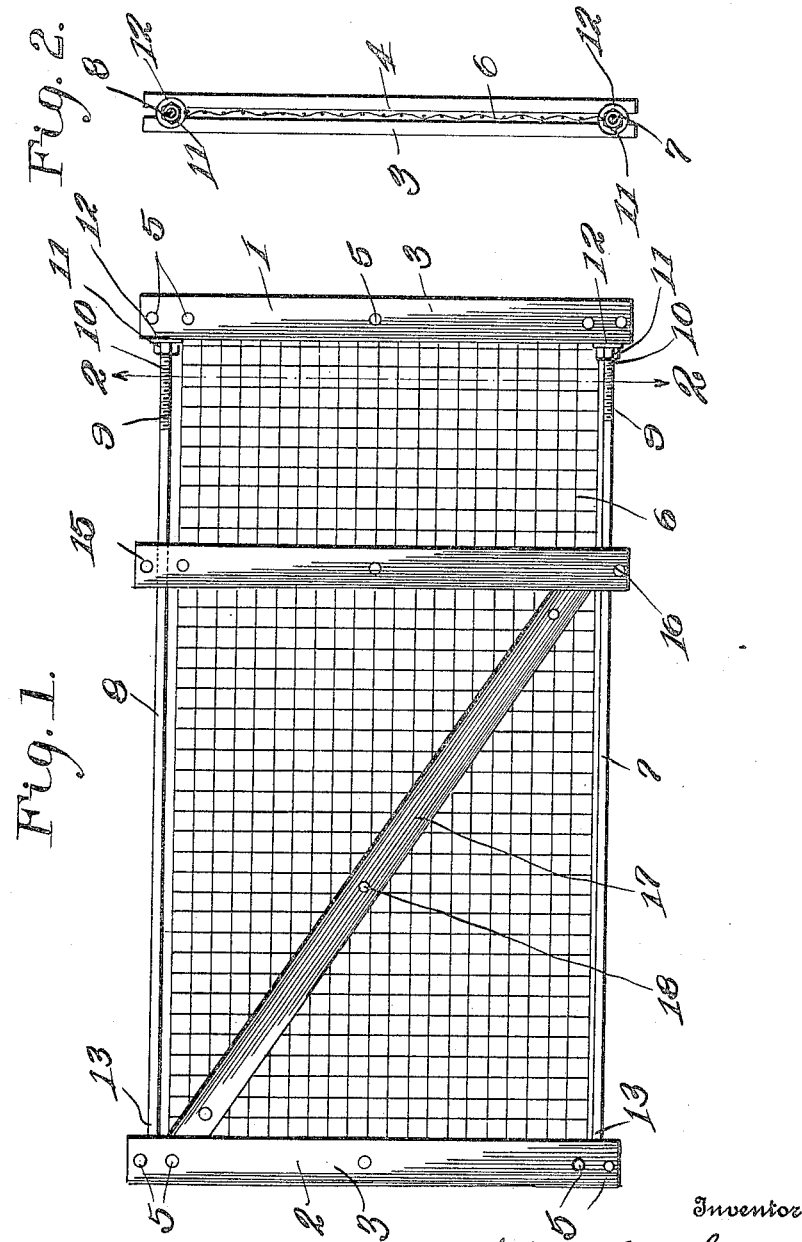

JOHN G. VAUGHN, OF GUTHRIE, MISSOURI.

GATE.

1,104,583.

Specification of Letters Patent. Patented July 21, 1914.

Application filed July 30, 1913. Serial No. 782,060.

*To all whom it may concern:*

Be it known that I, John G. Vaughn, a citizen of the United States, residing at Guthrie, in the county of Callaway and State of Missouri, have invented certain new and useful Improvements in Gates, of which the following is a specification.

This invention relates to a new and useful gate and an object of the same is the provision of a mesh work gate, especially a gate used for passage of vehicles therethrough, which embodies means whereby the mesh work of the gate may be stretched or tightened in the frame of the same whenever desired thus providing a gate which is neat in appearance at all times.

A still further object of this invention is the provision of braces for the gate which are simple in construction, durable and efficient.

With the foregoing and other objects in view, this invention relates to such details of construction as will hereinafter be more fully described, illustrated in the accompanying drawings and claimed.

In describing the invention in detail reference will be had to the accompanying drawings wherein like characters of reference designate like or corresponding parts throughout the several views, and in which, Figure 1 is a side elevation of the gate; and Fig. 2 is a cross sectional view on the line 2—2 of Fig. 1.

Referring to the drawings by numeral 1 and 2 designate the end pieces of the gate, each of which are constructed of a pair of strips 3 and 4 which are securely held together by means of bolts 5 or any other suitable fastening means.

The strips 3 and 4 which form the ends 1 and 2 of the gate are spaced slightly apart and have a rectangular shaped piece of meshed wire 6 securely connected between them. The rectangular piece 6 of meshed wire may be of any desirable shape or size the same to suit the various conditions in which the gate is to be employed.

Extending parallel with the upper and lower edges of the pieces 6 of meshed wire and connected fixedly to the end piece 2 are rods 7 and 8 which have external screw threads 9 formed on their ends 10, which ends are adjustably connected to the end piece 1. The screw threaded ends 10 of the rods 7 and 8 have nuts 11 mounted thereupon which nuts abut washers 12. The washers 12 abut the inner edge of the end piece 1. The ends 13 of the rods 7 and 8 are securely connected to the end piece 2 of the gate in any suitable manner. By turning the nuts 11 upon the screw threaded ends 10 on the rods 7 and 8 the distance between the two end pieces 1 and 2 of the gate may be varied and in this manner the mesh work stretched or tightened when desired so that the same will at all times be perfectly tight and smooth, thus preventing the sagging of the wire. A bar 15 which is also constructed of two strips as are the ends 1 and 2 of the gate is mounted upon a mesh wire intermediate the two end pieces 1 and 2 and securely held thereon by the bolts or other suitable fastening means 16 which also hold the two strips together. The strips are provided with openings extending through their upper and lower ends through which the rods 7 and 8 pass.

Bracing strips 17, one of which is placed upon each side of the piece 6 of meshed wire, extend diagonally across the gate from the upper end of the end piece 2 to the lower end of the bar 15. The two bracing strips 17 are securely connected and held firmly in place by means of bolts or other suitable fastening means 18. The bar 15 coacts with the diagonally disposed bracing strips 17 for bracing the gate and preventing the sagging of the same.

In practical fields certain minor features of construction may necessitate alterations to which the patentee is entitled provided such alterations are comprehended within the scope of what is claimed.

What is claimed is:

A gate comprising end pieces constructed of a plurality of strips, a piece of meshed wire clamped between said end pieces, rods, each of said rods having their corresponding ends rigidly connected to the upper and lower ends of one of said end pieces, the opposite ends of said rods being screw-threaded and loosely connected to the other of said end pieces, washers on said rods adjacent said last-mentioned end pieces, nuts in engagement with the screw threaded ends of said rods for adjusting the relative relation of said end pieces, a bar constructed of two strips disposed upon the opposite sides of said piece of wire approximately midway said end pieces, and bracing strips disposed diagonally upon the opposite sides of said piece of wire and rigidly connected to the upper end of said first-mentioned end-piece and to the bottom of said bar, substantially as described and for the purpose set forth.

In testimony whereof I affix my signature in the presence of two witnesses.

JOHN G. VAUGHN.

Witnesses:
JNO. N. LANGDON,
A. P. HOLT.